A. L. GAMMAGE.
WATER FILTER.
APPLICATION FILED DEC. 24, 1919.

1,358,840. Patented Nov. 16, 1920.

Witness
M. G. Crozier

Inventor
Arthur L. Gammage
by his attorney
Van Eaton Fish & Sheets

UNITED STATES PATENT OFFICE.

ARTHUR L. GAMMAGE, OF EVERETT, MASSACHUSETTS.

WATER-FILTER.

1,358,840. Specification of Letters Patent. Patented Nov. 16, 1920.

Application filed December 24, 1919. Serial No. 347,113.

*To all whom it may concern:*

Be it known that I, ARTHUR L. GAMMAGE, a citizen of the United States, residing at Everett, in the county of Middlesex and State of Massachusetts, have invented certain new and useful Improvements in Water-Filters; and I do hereby declare the following to be a full, clear, and exact description of the invention, such as will enable others skilled in the art to which it appertains to make and use the same.

The present invention relates to filter beds and more particularly to an improvement in the filter bottom for such beds.

Filter beds of the type to which the present invention relates commonly comprise a bed of sand or other granular material through which the water to be filtered percolates from top to bottom, thence being carried off through suitable channels or conduits. It is important in filter beds of this type that the filtering material shall be washed at frequent intervals in order to remove the accumulated silt. This washing operation is performed by forcing clean water under pressure from the bottom to the top of the bed. This washing water must be effectually distributed throughout the area of the bed under sufficient pressure to remove the dirt, and yet must not wash out the material of which the bed consists.

One object of the present invention then is to provide a filter bottom more particularly adapted for effectively distributing wash water throughout the filtering material without washing out this material.

A further object of the invention is to provide a filter bottom which will not deteriorate under long continued use and which may be constructed at a relatively low cost.

With the above objects in view, one feature of the invention contemplates the provision of a filter bottom having a water chamber, inlet passages leading into the water chamber and directed toward one another to cause the streams therefrom to impinge in the chamber, and a plurality of spherical distributing bodies supported above the chamber.

Still further features of the invention consist in certain novel features of construction, combinations and arrangements of parts hereinafter described and claimed, the advantages of which will be obvious to those skilled in the art from the accompanying description.

Figure 1:
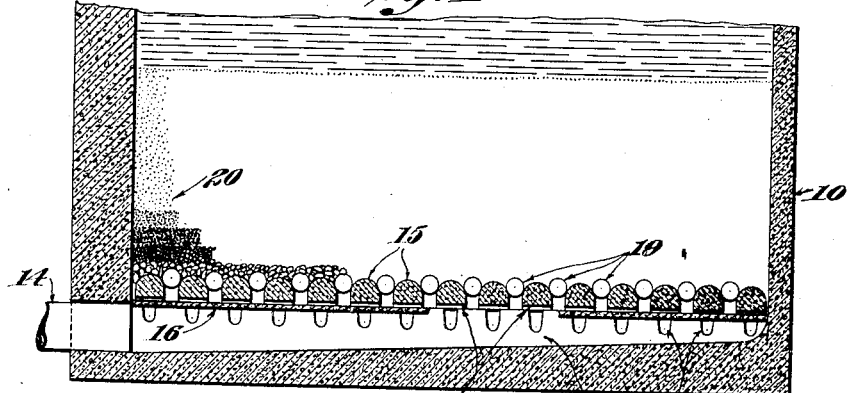
Figure 2:
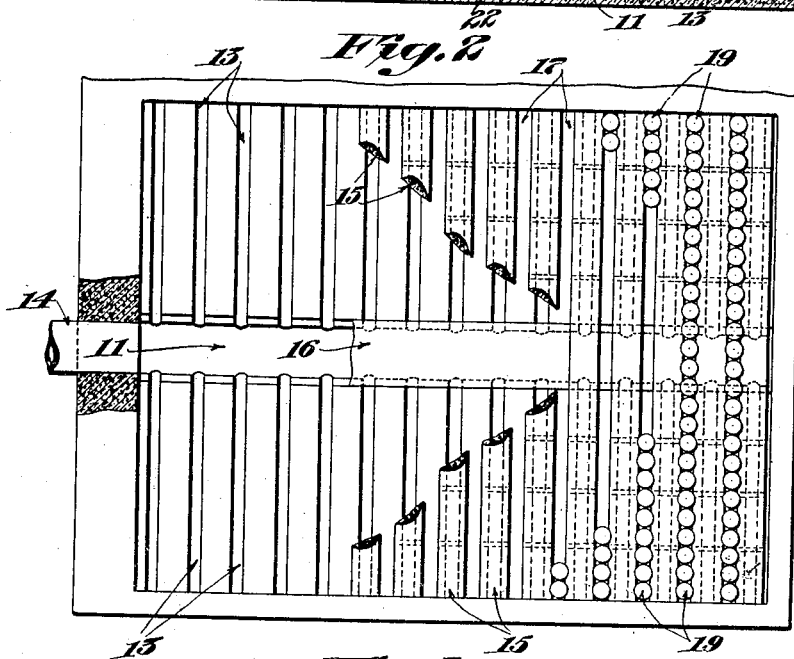
Figure 3:
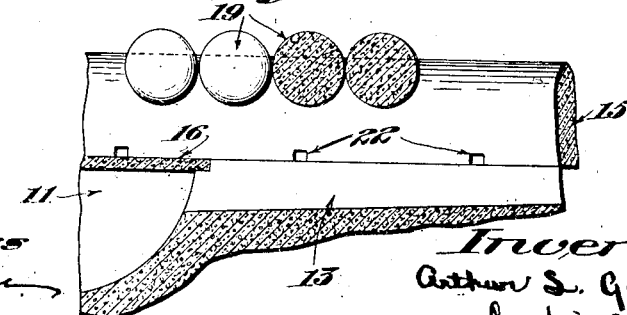

In the drawings illustrating the preferred form of the invention, Figure 1 represents a transverse section in elevation of the improved filter bottom; Fig. 2 is a plan view of the filter bottom with the filtering material removed; and Fig. 3 is a detail illustrating one side of a water chamber with inlet passages leading thereinto and spherical distributing bodies supported above.

The illustrated embodiment of the present invention comprises generally a concrete bed with a series of distributing channels formed therein and closed by concrete slabs preferably secured to the bed. The concrete slabs are spaced apart to form water chambers between them and each slab is provided with inlet passages affording communication between the distributing channels and the water chambers. These inlet passages are directed toward one another in such a manner that the streams of water under pressure issuing therefrom impinge in the chambers and thus expend their velocity against one another rather than against the distributing bodies which are supported above the water chambers. These distributing bodies preferably comprise spherical balls of concrete which are supported by the curved surfaces of the concrete slabs forming the opposite sides of each water chamber. This type of filter bottom serves to properly dispose of the filtered water which percolates down through the filtering bed and at the same time provides for an effective distribution of wash water without dislodging the distributing bodies or the filtering bed supported thereon.

As shown in the drawings, a tank 10 of concrete is provided with a main water channel 11 and a series of lateral distributing channels 13 formed in the bottom. The main channel communicates with the usual system of piping through a connection indicated at 14. Each of the distributing channels is closed by a concrete slab 15 extending completely across the filter bottom, as shown in Fig. 2, and substantially semi-cylindrical in cross section. The main channel may be closed on the top by a flat slab 16 of concrete, or other material. It is preferably desired to secure these slabs to the bed of the tank by grouting, or other suitable means so that these slabs will not become displaced during continued use. The location of the slabs 15 in the manner shown forms a series of separate water chambers indicated at 17 which extend transversely of the tank, these chambers being partially closed at the top by separate rows of spherical distributing bodies 19 which coöperate with the arched surfaces of the supporting slabs to distribute the wash water throughout the filtering material. The filtering material may consist of sand or other granular material, as indicated at 20, supported by the arched surfaces of the slabs and the distributing bodies 19.

It is desirable to inject the wash water through the filtering material under a substantial head and yet perform this distribution of wash water in such a manner that neither the distributing bodies nor the filtering material will be dislodged. To this end, the water chambers 17 are connected with the distributing channels 13 through a series of transverse slots 22 formed in the bottom of each covering slab 15. These slots provide inlet passages leading into opposite sides of the water chambers, and, as shown in the drawings, are directed toward one another in such a manner that the streams issuing therefrom will not impinge directly against the distributing bodies. As will be observed from Fig. 2 of the drawings, each of the covering slabs is provided with a series of regularly spaced transverse slots which distribute the water uniformly throughout the length of the water chambers 17.

While it is preferred to employ this specific construction and arrangement of parts shown and described, it will be understood that this construction and arrangement is not essential except so far as specified in the claims, and may be changed or modified without departing from the broader features of the invention.

The invention having been described, what is claimed is:

1. A filter bottom comprising a water chamber, inlet passages leading into the water chamber and directed toward one another to cause the streams therefrom to impinge in the chamber, means for distributing water to the inlet passages, and a plurality of spherical distributing bodies supported above the chamber.

2. A filter bottom comprising an elongated water chamber, a series of distributing bodies supported above the chamber by the opposite walls, a series of inlet passages leading into opposite sides of the chamber, and means for conducting water to the inlet passages.

3. A filter bottom comprising a water chamber, spherical distributing bodies supported by opposite walls of the chamber, inlet passages leading into opposite sides of the chamber and designed to cause the streams of water to impinge against one another, and distributing channels communicating with the inlet passages.

4. A filter bottom comprising a concrete bed having a series of distributing channels formed therein, a series of covering slabs closing the channels and arranged to form water chambers between them, inlet passages in the slabs connecting the distributing channels and chambers, spherical distributing bodies supported above the chambers, and filtering material supported on the distributing bodies and covering slabs.

5. A filter bottom comprising a concrete bed having a series of parallel distributing channels formed therein, covering slabs covering each of the channels and spaced apart to form chambers therebetween, a row of spherical distributing bodies supported by the opposite walls of each pair of slabs above the chambers formed therebetween, and a series of lateral inlet passages connecting the distributing channels and chambers.

6. A filter bottom comprising a water chamber, a series of distributing bodies supported above the chamber, an inlet passage of restricted diameter leading into one side of the chamber and designed to direct the stream of water issuing therefrom toward the opposite side of the chamber, and means for conducting water to the inlet passage.

7. A filter bottom comprising a water chamber, a series of distributing bodies supported above the chamber, and a plurality of inlet passages of restricted diameter leading into opposite sides of the chamber and arranged to direct the streams of water issuing therefrom transversely across the chamber.

ARTHUR L. GAMMAGE.